United States Patent [19]

Peterlini

[11] Patent Number: 4,530,430
[45] Date of Patent: Jul. 23, 1985

[54] DEVICE FOR TRANSFERRING SHAPED ARTICLES FROM A FIRST TO A SECOND BELT BY UNIFORM ORIENTATION ARRANGEMENT ON THE LATTER

[75] Inventor: Franco Peterlini, Reggio Emilia, Italy

[73] Assignee: M.O.S.S. S.r.l., Reggio Emilia, Italy

[21] Appl. No.: 387,781

[22] Filed: Jun. 14, 1982

[30] Foreign Application Priority Data

Jul. 24, 1981 [IT] Italy .................. 23143 A/81

[51] Int. Cl.³ ............................................ B65G 43/08
[52] U.S. Cl. ................................... 198/395; 198/400
[58] Field of Search ............... 198/400, 486, 376, 394, 198/395

[56] References Cited

U.S. PATENT DOCUMENTS

| | | | |
|---|---|---|---|
| 1,664,144 | 3/1928 | Weeks | 198/394 X |
| 2,833,434 | 5/1958 | Stover et al. | 198/486 X |
| 3,095,082 | 6/1963 | Allgeyer | 198/486 X |
| 3,216,551 | 11/1965 | Peck | 198/395 |
| 3,302,539 | 2/1967 | Moffet | 198/486 X |
| 3,384,236 | 5/1968 | Best et al. | 209/541 |
| 3,433,346 | 3/1969 | McCaskill | 198/352 |
| 3,468,435 | 9/1969 | Ellwanger et al. | 198/486 X |
| 3,520,393 | 7/1970 | Horning et al. | 198/486 X |
| 3,550,789 | 12/1970 | Jaeger | 198/486 X |
| 4,382,500 | 5/1983 | Oyama et al. | 198/486 X |

FOREIGN PATENT DOCUMENTS

| | | |
|---|---|---|
| 1148485 | 1/1966 | Fed. Rep. of Germany . |
| 1265655 | 12/1968 | Fed. Rep. of Germany . |
| 2316355 | 10/1974 | Fed. Rep. of Germany . |
| 2007251 | 4/1968 | France . |
| 93496 | 4/1969 | France . |
| 2088579 | 1/1972 | France . |
| 2257513 | 8/1975 | France . |
| 1236932 | 6/1971 | United Kingdom . |

Primary Examiner—Joseph E. Valenza
Assistant Examiner—Stuart J. Millman
Attorney, Agent, or Firm—Oblon, Fisher, Spivak, McClelland & Maier

[57] ABSTRACT

The invention relates to a device for transferring shaped articles, such as bottles, containers, small glasses, etc. from a first to a second belt by uniform orientation arrangement on the latter.

More particularly, the device is for feeding the containers thus oriented to a machine for inscription printing on the surface thereof. The device comprises a lever oscillating between two positions of end of stroke at which one free end thereof is above either of said belts. Such a free end of the lever carries a gripping member for grasping one container at a time from the first belt, then releasing it on the second belt. The gripping member is rotatable about its own axis through the action of a pneumatic rotary cylinder, while said gripping member has an attitude or position which is strictly controlled by suitable guiding members.

13 Claims, 8 Drawing Figures

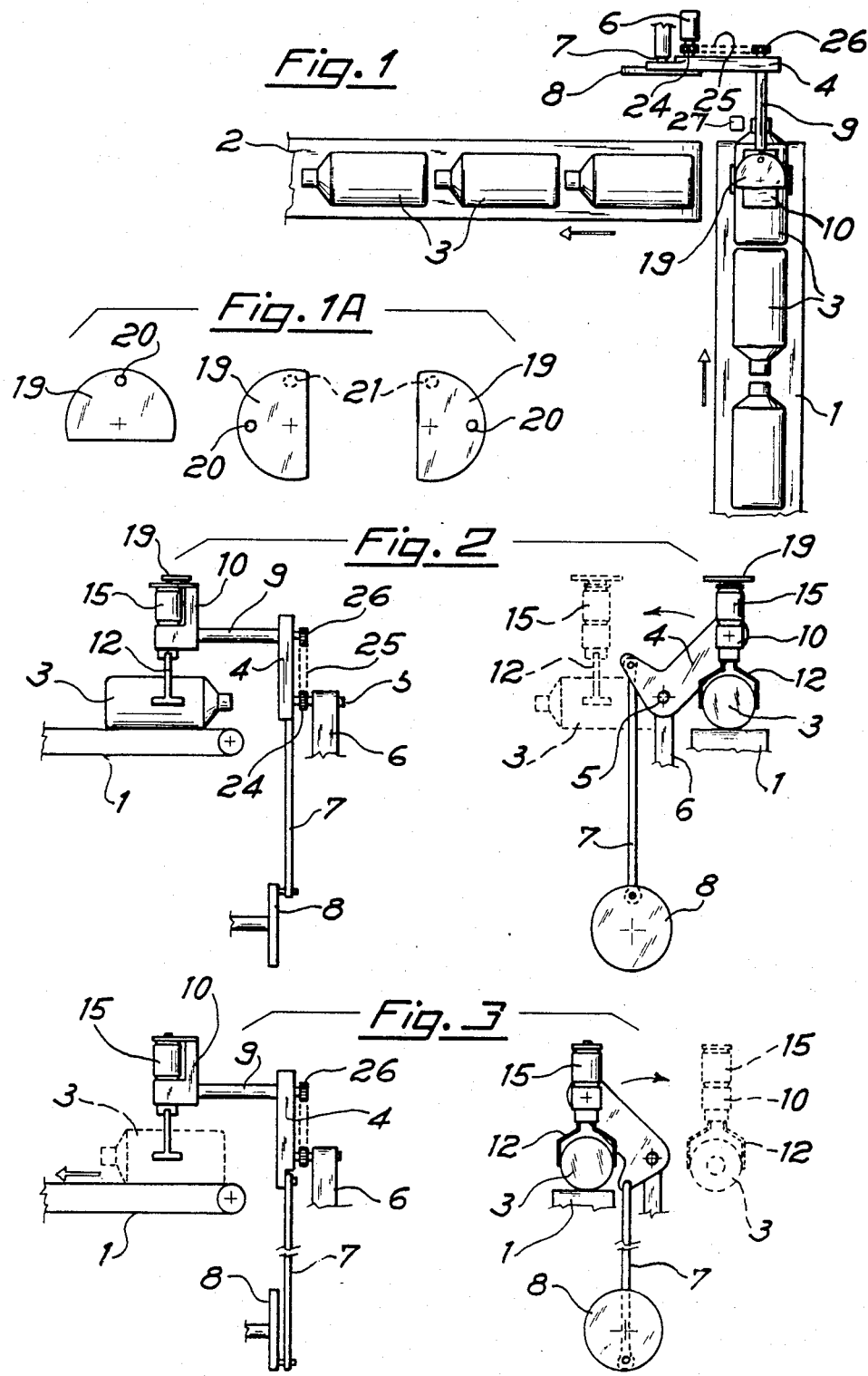

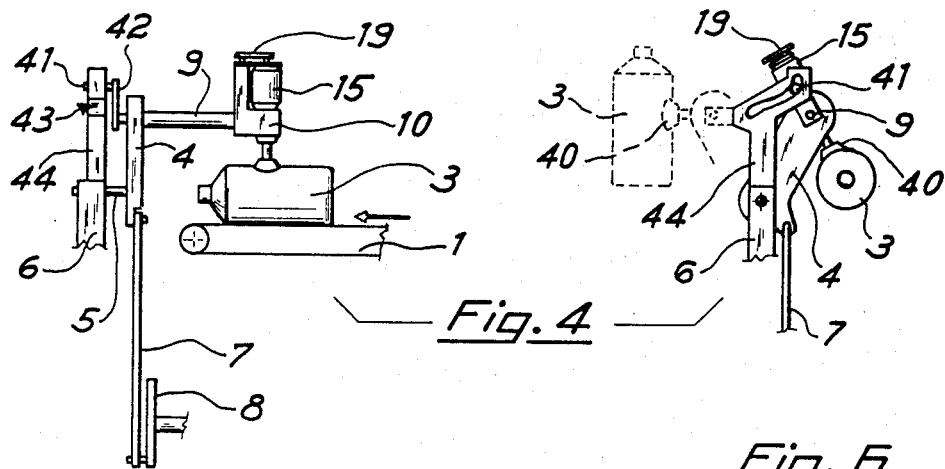
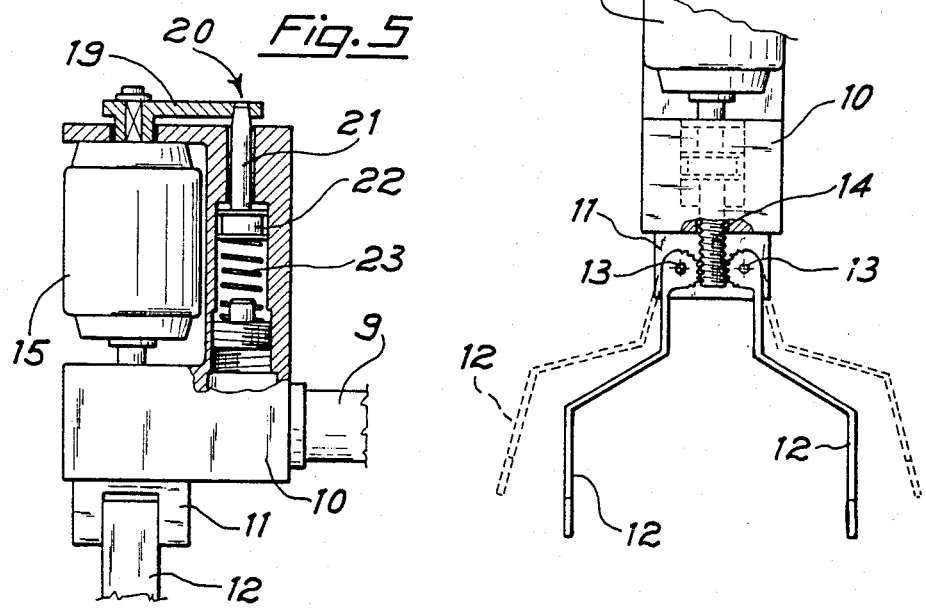
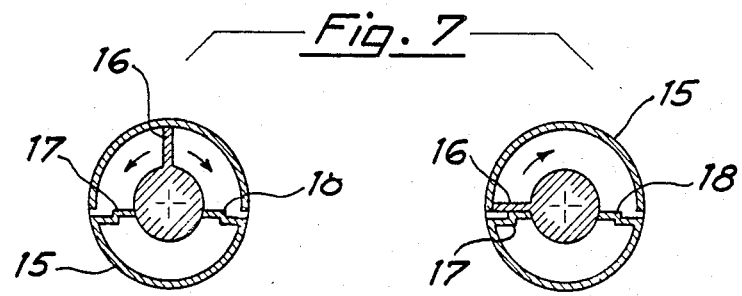

DEVICE FOR TRANSFERRING SHAPED ARTICLES FROM A FIRST TO A SECOND BELT BY UNIFORM ORIENTATION ARRANGEMENT ON THE LATTER

This invention relates to a device for transferring shaped articles from a first to a second belt by uniform orientation arrangement on the latter. More particularly, the device is used for feeding bottles, containers or the like, as uniformly oriented, to a machine for printing inscriptions, illustrations and the like on the outer surface thereof, or to filling machines or the like.

It is well known that in many cases the need arises for carrying out operations on shaped articles, which must be uniformly oriented at the final stage of the processing thereof: such articles are usually randomly loaded in a hopper for aligned unloading onto a conveyor belt or chute or the like, but where the articles are arranged with the bottom or top portion thereof facing the belt feeding direction. Accordingly, the device has the purpose of drawing these articles from the belt and lying the same onto another belt, after orienting all of the articles in a same direction.

A practical example is that of containers or bottles that have to be printed on the outer surface thereof. Some of these containers from a loading hopper and forward moving therefrom on a conveyor belt have the neck or inlet facing the feeding direction, while other containers have the bottom thereof facing such a feeding direction.

Devices have been already contrived for drawing bottles from a conveyor belt and laying such bottles onto another belt following orientation thereof. A device of such a design is disclosed in the Italian patent application No. 46827 A/77 filed on Feb. 28, 1977. It comprises an oscillating lever, of which the free end, that time by time be positioned on the belt for the incoming bottles and on the belt carrying the bottles away, respectively, carries a hollow tubular element having a sucker at its end, said hollow element being connectable to a suction pump. When the sucker bears on a bottle to be drawn from the first belt, the air suction causes the bottle to be coupled to the sucker, while the suction release (which occurs when the sucker is above the second belt) causes the separation of the bottles, which is thereby laid on the second belt.

The device comprises two extremely complicated control systems, the first of which comprising a rod pivoted to the sucker assembly and sliding within a guide sleeve, the latter being rotatable on a fixed pin to the machine frame. Even though such a system could appear to be of simple design, such is not the case when taking into account the high rate of the movement for the bottle drawing device. The second system, which must be necessarily provided, is that for causing the sucker to rotate about its own axis, in order to rotate those bottles which should arrive on the first belt with an orientation direction other than that designed.

The sucker rotation system in the above mentioned Italian patent application comprises a double acting pneumatic cylinder operating on an arcuate rack meshing with a pinion mounted on the axis of the sucker supporting tubular element: by continuously displacing at high speed the plunger of the relative piston in either direction, the double acting cylinder causes the sucker to rotate when a sensor element, disposed on the bottle incoming belt, signals that the bottle which is about to be drawn should or not be rotated.

Then, it should be taken into account that the entire pneumatic cylinder assembly, along with the members connected thereto, is supported by the oscillating lever element, which accordingly has to carry at high speed and by a motion of continuous change in direction some unnegligible weight, or lightened and accordingly fragile bodies.

It is the primary object of the present invention to provide a device of the above mentioned design, which is of extremely simple and reliable structure, light weight and suitable for transferring oriented containers on drawing belts forming any angle with that of the incoming belt.

It is another object of the invention to provide a device capable of drawing and transferring bottles, containers or articles of any shape, even with rugged, rough or hollowed out surface, still with maximum reliability and operating speed.

These and still further objects are achieved by a device comprising a lever element rotatably mounted on a pin integral with a rigid supporting bracket and connected to a control mechanism causing the oscillation thereof between two positions of end of stroke, at the first of which a free end of the lever element is in proximity to the first belt, and at the second of which it is in proximity to the second belt, on said free end of the lever element there being mounted, through a pin about the axis of which it is freely rotatable, a support body carrying a gripping member for said articles and a device for controlling the rotation of said gripping member in either direction, means being also provided for controlling the attitude or position of said support body relative to said lever element, drive members for controlling the operation of said gripping member, and means for operating said device for rotation control as a function of the orientation of the shaped articles incoming to the transfer device on said first belt, characterized in that said device for controlling the rotation of said gripping member comprises a cylinder, internally of which an intermediate vane is mounted and rotatable relative thereto between two walls of end of stroke, along with said cylinder and walls of end of stroke said intermediate vane defining two closed chambers, in which a hole opens for the admission therein and respectively discharge therefrom of a pressure fluid, one of said cylinder and intermediate vane being rotatably connected to the gripping member, and the other being blocked or clamped on said support body.

In order that the structure and features of the gripping and orienting device according to the invention be more clearly understood, some embodiments thereof will be now described as given by mere way of unrestrictive example with reference to the accompanying drawings, in which:

FIG. 1 is a plan view of an incoming belt and an unloading belt, with the device positioned and acting therebetween;

FIG. 1a is a plan view of a stop disc forming part of the device at three different positions taken during operation;

FIG. 2 shows two views taken according to two different angles together forming 90° for a first embodiment of the device as that shown in FIG. 1;

FIG. 3 also shows two views taken according to two directions together forming 90° for a second embodiment of the device;

FIG. 4 is also a view of a further embodiment of the device shown in two positions as seen in accordance with directions together forming 90°;

FIG. 5 is an enlarged sectional view showing the detail of the device for controlling the rotation of the gripping member;

FIG. 6 is an enlarged schematic view of the gripping member; and

FIG. 7 is a cross-sectional view of the cylinder controlling the rotation of the gripping member above its own axis, the cylinder being shown at two different working positions.

Referring first to FIG. 1, schematically showing two conveyor belts, respectively denoted by reference numerals 1 and 2 (it being evident that instead of belts, provision could be made for chutes, roller conveyors, etc.), the belts carrying shaped articles which in the case shown comprise containers or bottles.

On the belt 1 such bottles 3 are randomly oriented, that is some bottles have the inlet or neck thereof facing the feeding direction of the belt, other in opposite direction: the bottles for transfer on belt 2 should all have the inlet or neck portion in the same direction in order to be all supplied in a same correct manner to a user machine, for example to a machine for printing inscriptions on the surface thereof. Only for the sake of clarity, on the drawing the bottles have been shown as very close to one another on the two belts and quite in contact with one another, it being however evident that each bottle could be spaced apart from the preceding or following bottle.

Reference is now made to FIGS. 1, 1A and 2, schematically showing the device for transferring the bottles 3 from belt 1 to belt 2, the latter forming an angle of 90° with belt 1.

This device comprises a lever 4 which is freely rotatably mounted on a pin 5 integral with a rigid supporting bracket 6. One end of said lever 4 is through a tie rod 7 connected to an eccentric stake of a flywheel 8 synchronously moving with the printing machine in a per se well known manner and not forming part of the invention.

The free end of lever 4 has mounted thereon a pin 9 freely rotatable about its own axis, having a support body 10 (shown on enlarged scale in FIG. 5) integral therewith, which body carries the bottle gripping member, so that the latter can freely rotate about its own axis. In this embodiment, the gripping member comprises a body 11 rotatable about said axis and carrying pliers comprising two levers 12, which are freely rotatable on pins 13 parallel to one another and which have the free ends thereof shaped as a jaw, while having adjacent said pins 13 toothed arcuate surfaces (as clearly shown in FIG. 6 which is a view rotated through 90° relative to FIG. 5), such toothed arcuate shaped surfaces being spaced apart from one another and having a rod 14 extending therebetween, the two surfaces of this rod facing the rack shaped levers and engaging with the toothed arcuate surfaces of the two levers 12. The rack 14 is part of a pneumatic piston housed within a cylinder which together with said body 11 is rotatable about its own axis relative to body 10, thus rotating together with the pliers. The operating cylinder for said rack 14 may be a double acting or also a single acting cylinder with a spring acting upon the piston for causing the latter to move back to the rest position as soon as the admission of compressed air to the cylinder inside is stopped.

In FIG. 6 the pliers have been shown at closed or gripping position, while such pliers have been shown hatched to show the position taken under opening conditions at an intermediate opening step.

In order to cause the rotation of the pliers and members connected thereto, a rotary pneumatic cylinder 15 is provided, this cylinder being internally hollow and accommodating an intermediate vane 16 (see the schematic sections thereof in FIG. 7) which with respect to the cylinder is rotatable about the axis of the cylinder (it being evident that the vane could be stationary and the cylinder rotate) between two ends of stroke comprising two walls 17 and 18, respectively. Said intermediate vane 16 forms a sealed closed chamber with said wall 17 and with the adjacent surface portion of cylinder 15, and forms another sealed chamber with said wall 18 and cylinder. Either of these chambers may have a pressure fluid, such as air, admitted therein, so as to cause the mutual rotation of the cylinder with respect to vane 16, as it can be readily understood. The rotating portion of the gripping member, of which said pliers 12 are part, is restrained to rotation to the rotating portion (cylinder or vane) of the pneumatic cylinder 15, so that the supply of compressed air to one of the sealing chambers of the rotary cylinder causes the rotation of the pliers 12 in either direction through a complete arc of 180°.

In accordance with the device embodiment shown in FIGS. 1, 1A, 2, 5 and 7, that portion of the rotary pneumatic cylinder 15 turning with respect to the supporting body 10, has integral therewith an arcuate plate 19 having a hole or recess 20 formed in the central peripheral portion thereof. Below said plate 19 and at the arc along which the hole 20 moves during the rotation of the rotary portion of said cylinder 15, there extends the stem 21 of a pistion 22 of a simple acting pneumatic cylinder shown in FIG. 5, a spring 23 acting upon said piston and tending to maintain the stem at the position shown in said FIG. 5.

Now, referring again to FIGS. 1 and 2, such figures schematically show that a gear wheel 24 on said pin 5 is integral with said bracket 6 is keyed and has a chain 25 wrapped thereon, which chain is also wrapped on a gear wheel 26 keyed on the pin 9.

The operation of the device will now be briefly explained.

When a bottle 3 arrives at the proximity to the device according to the invention and stops against a fixed stop, it acts upon a sensor (for example, a microswitch or a photocell 27, etc.) that establishes the orientation for the bottle and determines the direction in which it should be rotated before being laid onto the belt 2.

The rotation of flywheel 8 causes an alternating movement of said tie rod 7 and accordingly the oscillation of lever 4 from the position shown by full line in the right portion of FIG. 2 to the position shown by dashed line. Since the two gear wheels 24 and 26 connected with said chain 25 have a same number of teeth, this would be effective that during the whole to and fro movement said body 10 with the pliers 12 and cylinder 15 maintains a perfect position perpendicular to the plane (should the numbers of teeth for the two gear wheels be different, it would be possible to vary the orientation of the pliers with the relative assembly of support 10 and cylinder 15 with respect to the horizontal plane). When the pliers arrive at above the bottle bearing against the stop at the end of belt 1, the pliers jaws 12 are open. At this time, a cam controls the opening of a valve for the admission of compressed air into the bottom of the plunger, with which the rack 14 is integral, whereby the latter moves upward (FIG. 6) causing the closure of the pliers jaws which thereby grasp the bottle 3.

As the counterclockwise rotational movement of lever 4 has been started (with respect to the right portion of FIG. 2), at the second half of its travel or stroke an electrovalve enables the entrance of compressed air in the rotary cylinder 15 to cause the rightward or leftward rotation of the pliers, depending on the orientation of the bottle 3 drawn by the pliers. At the same time, a cam acts upon the pneumatic valve supplying compressed air to the reaction chamber above the plunger 22, which lowers the plunger 22 together with the stem 21, thus releasing the disc 19. Thus, the disc 19 rotates rightwards or leftwards depending on the original orientation of the bottle 3 drawn from the belt 1. Under the rest condition of FIG. 5, the vane 16 is at the conditions shown in the left portion of FIG. 7. A relative rotation to the right or to the left of the rotary cylinder with respect to the intermediate vane 16 can cause the rotation through 90° in one direction or in the opposite direction of the pliers and accordingly of the bottle carried thereby.

At the end of stroke, the valve controlling the air entrance to the control plunger of rack 14 is disconnected, so that due to the action of a spring acting on such a plunger moving it back to rest condition, the pliers jaws open causing the fall of the bottle oriented in the correct position on the belt 2.

During the return stroke towards the belt 1, the valve controlling air entrance to the reaction chamber above the plunger 22 is disconnected, whereby the stem 21, as urged by the spring 23, bears on the surface of disc 19 until encountering the hole or recess 20, inserting therein and thus blocking said disc 19 with the rotating portion integral therewith at a clearly defined position with respect to said body 10.

In FIG. 7 the case is shown where the intermediate vane 16 forms an angle of 90° with the fixed walls 17 and 18: in such a case, the device is suitable for transferring the bottles 3 after correct orientation thereof onto the belt 2 forming an angle of 90° with belt 1. However, if desiring that belt 2 should form an angle other than 90°, for example 30°, with respect to belt 1, the stop of stem 21 on plate 19 should occur so that, under the so well defined rest conditions, the intermediate vane 16 forms an angle of 30° with said wall 17 or 18, the system adjustment or setting for determining this angle being made once and for all at the time of the device assembling.

The embodiment of the device shown in FIG. 3 is quite similar to that previously described in detail and differs therefrom in that the incoming bottles have to be transferred from one belt to another belt parallel thereto. In such a case, the bottles incoming on the supply belt as correctly oriented are not subjected to any rotation about a vertical axis, but have to rotate through 180° about such an axis, coincident with the pliers axis, should the original orientation thereof be uncorrect. In this case the device is quite similar to that above described (and thus for the sake of clarity and simplicity the same reference numerals have been used to indicate the same parts of the device), with the only exception that it is no longer required to have the moving plate 19 with the stop device comprising the stem 21, as the intermediate vane 16 should in any case move between the two ends of stroke formed by said walls 17 and 18.

The embodiment of the device shown in FIG. 4 also comprises a lever 4 (also in this case and still for the sake of clarity and simplicity the same reference numerals have been used to indicate the same structural parts previously described) operated by a tie rod 7 and carrying a pin 9 rotatable about its own axis, with which a support body 10 is integral. The above described rotatable pneumatic cylinder 15 is mounted on said body 10 and at the top thereof is provided with a shaped rotatable plate 19 having the above described stop plunger acting there upon.

Instead of the pliers illustrated in connection with the other figures of the accompanying drawings, in this case the bottle gripping member comprises a sucker 40 which can be connected to a sucking source. Provision is not made for gear wheels with the relative chain for the control of the sucker attitude or position, but in lieu thereof an orientation system is provided as comprising an extension 41 integral with an arm 42 keyed on the pin 9. This extension 41 is extensive and movable within a shaped guide 43 in a fixed rigid bracket 44, clearly shown in FIG. 4. It is evident that a rolling bearing or an antifriction slide or the like could be mounted on the portion of extension 41 extending within the shaped guide. When the lever 4 moves, the extension 41 by sliding in said guide 43 causes the assembly of sucker 40 and rotary cylinder 15 to rotate about the pin 9, thus enabling to grasp the bottles incoming at horizontal lying down position on the supply or feed belt 1 to transfer and lay such bottles then in erected or vertical position (as shown by hatching on the right portion of FIG. 4) on a drawing conveyor belt, not shown for the sake of simplicity. When the sucker 40 arrives at above the bottle that has stopped on the stop provided at the end of the supply or feeder belt 1, such a sucker is already connected to the sucking pump.

Upon commencement of the return movement of lever 4, in the second half of the stroke thereof, the electrovalve enables the air to enter the rotary cylinder 15, so as to cause said sucker to rotate in rightward or leftward direction depending on the presetting thereof by the sensors at the time of the bottle stop on the supply or feed belt. At the same time, a cam acts upon the pneumatic valve controlling the supply of air above the plunger 22 (FIG. 5) which lowers, thus disengaging the stem 21 from the hole 20 in the plate 19 of the rotary cylinder, thus allowing the latter to rotate rightwards or leftwards depending on the orientation of the bottle drawn by the sucker. At the end of stroke for the lever 4, the suction terminates within the sucker 40 and the bottle 3 is laid in erected attitude on the belt for transfer thereof to the user machine. During the return stroke, the valve controlling the air entrance above the plunger is disconnected, so that the stem 21 is preset to stop the plate 19 and block the rotary cylinder with respect to the intermediate vane housed therein.

Referring to the above figures of the accompanying drawings, electrovalves, cams and the like have been referred to, members which have all not been shown for the sake of clarity and simplicity and because readily realizable and presettable by those skilled in the art.

From the foregoing it clearly appears the extreme simplicity, versatility and reliable operation of the device for drawing and transferring at any oriented position articles of irregular shape and with smooth surface (by using the pliers or the sucker), or with rugged surface or having recesses (by using the pliers).

What is claimed is:

1. A device for transferring shaped articles from a first to a second belt, by arranging the same as uniformly oriented on the latter, comprising a lever element rotatably mounted on a pin integral with a rigid supporting bracket and connected to a control mechanism causing the oscillation thereof between two ends of stroke, at the first of which one free end of the lever element is adjacent to the first belt and at the second of which it is adjacent to the second belt, on said free end of the lever element there being mounted, through a pin about the axis of which it is freely rotatably, a support body carrying a gripping member for said articles and a device for controlling the rotation of said gripping member in either direction, means being also provided for controlling the attitude or position of said support body relative to said lever element, drive members for controlling the operation of said gripping member, and means for operating said rotation control device as a function of the orientation of the shaped articles incoming to the transfer device on said first belt, characterized in that said device for controlling the rotation of said gripping member comprises a cylinder, internally of which an intermediate vane is mounted and rotatable relative thereto between two walls of end of stroke, along with said cylinder and walls of end of stroke said intermediate vane defining two closed chambers, in which a hole opens for the admission therein and respectively discharge therefrom of a pressure fluid, one of said cylinder and intermediate vane being rotatably connected to the gripping member, and the other being blocked or clamped on said support body.

2. A device according to claim 1, wherein said means for controlling the attitude or position of said support body comprise a gear wheel keyed on said supporting pin for the lever element and a gear wheel coaxial with the pin supporting said support body with which such a gear wheel is integral, the two gear wheels being restrained to each other by connection members.

3. A device according to claim 2, wherein said connection members comprise a looped chain enclosing the two gear wheels.

4. A device according to claim 1, wherein said means for controlling the attitude or position of said support body comprise an eccentric extension projecting from an arm integral with the pin supporting said support body, which is also integral with said pin, such an extension extending in a shaped guide within which said extension moves and is guided as the lever element moves between its two ends of stroke.

5. A device according to claim 1, wherein disconnectable members are provided for blocking said intermediate vane at a predetermined position between said two walls of end of stroke.

6. A device according to claim 1, wherein said gripping member comprises pliers including two levers freely rotatable on pins parallel to one another and having the free ends thereof in the shape of jaws, adjacent the pins on which they are mounted the two levers having toothed arcuate surface, between which a dual rack toothed rod extends and engages with said toothed arcuate surfaces, the toothed rod being carried by a member controlling the axial translation thereof in either direction.

7. A device according to claim 2, wherein disconnectable members are provided for blocking said intermediate vane at a predetermined position between said two walls of end of stroke.

8. A device according to claim 3, wherein disconnectable members are provided for blocking said intermediate vane at a predetermined position between said two walls of end of stroke.

9. A device according to claim 4, wherein disconnectable members are provided for blocking said intermediate vane at a predetermined position between said two walls of end of stroke.

10. A device according to claim 2, wherein said gripping member comprises pliers including two levers freely rotatable on pins parallel to one another and having the free ends thereof in the shape of jaws, adjacent the pins on which they are mounted the two levers having toothed arcuate surface, between which a dual rack toothed rod extends and engages with said toothed arcuate surfaces, the toothed rod being carried by a member controlling the axial translation thereof in either direction.

11. A device according to claim 3, wherein said gripping member comprises pliers including two levers freely rotatable on pins parallel to one another and having the free ends thereof in the shape of jaws, adjacent the pins on which they are mounted the two levers having toothed arcuate surface, between which a dual rack toothed rod extends and engages with said toothed arcuate surfaces, the toothed rod being carried by a member controlling the axial translation thereof in either direction.

12. A device according to claim 4, wherein said gripping member comprises pliers including two levers freely rotatable on pins parallel to one another and having the free ends thereof in the shape of jaws, adjacent the pins on which they are mounted the two levers having toothed arcuate surface, between which a dual rack toothed rod extends and engages with said toothed arcuate surfaces, the toothed rod being carried by a member controlling the axial translation thereof in either direction.

13. A device according to claim 5, wherein said gripping member comprises pliers including two levers freely rotatable on pins parallel to one another and having the free ends thereof in the shape of jaws, adjacent the pins on which they are mounted the two levers having toothed arcuate surface, between which a dual rack toothed rod extends and engages with said toothed arcuate surfaces, the toothed rod being carried by a member controlling the axial translation thereof in either direction.

* * * * *